(12) United States Patent
Suchomel et al.

(10) Patent No.: US 11,010,825 B2
(45) Date of Patent: May 18, 2021

(54) SYSTEM AND METHOD FOR SYNCHRONIZED VIDEO LOGGING AND PLAYBACK OF AUCTION ACTIVITY

(71) Applicant: Auction Frontier, LLC, Roseville, CA (US)

(72) Inventors: Brad Suchomel, Roseville, CA (US); Scott Suchomel, Roseville, CA (US)

(73) Assignee: AUCTION FRONTIER LLC, Roseville, CA (US)

( * ) Notice: Subject to any disclaimer, the term of this patent is extended or adjusted under 35 U.S.C. 154(b) by 418 days.

(21) Appl. No.: 15/650,926

(22) Filed: Jul. 16, 2017

(65) Prior Publication Data

US 2019/0019243 A1    Jan. 17, 2019

(51) Int. Cl.
| | | |
|---|---|---|
| *G06Q 40/00* | (2012.01) | |
| *G06Q 30/08* | (2012.01) | |
| *H04N 21/43* | (2011.01) | |
| *H04N 21/431* | (2011.01) | |
| *H04N 21/472* | (2011.01) | |
| *H04N 21/414* | (2011.01) | |
| *H04N 21/4143* | (2011.01) | |
| *H04N 21/478* | (2011.01) | |

(52) U.S. Cl.
CPC ......... *G06Q 30/08* (2013.01); *H04N 21/4143* (2013.01); *H04N 21/41407* (2013.01); *H04N 21/431* (2013.01); *H04N 21/4307* (2013.01); *H04N 21/47202* (2013.01); *H04N 21/47815* (2013.01)

(58) Field of Classification Search
CPC ............. G06Q 30/08; H04N 21/41407; H04N 21/4143; H04N 21/4307; H04N 21/431; H04N 21/47202; H04N 21/47815

USPC .................................................... 705/35–40
See application file for complete search history.

(56) References Cited

U.S. PATENT DOCUMENTS

| | | |
|---|---|---|
| 6,813,612 B1 | 11/2004 | Rabenold |
| 7,461,022 B1 | 12/2008 | Churchill |
| 7,664,677 B2 | 2/2010 | Rabenold |
| 7,716,090 B1 | 5/2010 | Rabenold |

(Continued)

FOREIGN PATENT DOCUMENTS

WO    WO-2005104544 A2 * 11/2005    ....... H04N 21/64322

OTHER PUBLICATIONS

Jie et al: "Collaborative Caching in Wireless Video Streaming Through Resource Auctions", pp. 458-466, IEEE Journal on Selected Areas in Communications (vol. 30, Issue) (Year: 2012).*

(Continued)

*Primary Examiner* — Edward J Baird
(74) *Attorney, Agent, or Firm* — Inventive Law Inc.; Jim H. Salter

(57) ABSTRACT

A system and method for synchronized video logging and playback of auction activity is disclosed. A particular embodiment includes: establishing, by use of a data processor and a data network, a data connection with at least one auction site; gathering auction data and video streams from the auction site; synchronizing the video streams with corresponding auction data; presenting a user interface to a user, the user interface enabling the user to select a desired portion of the auction data; and rendering the selected portion of the auction data along with a corresponding synchronized video clip from a video stream from the auction site.

17 Claims, 5 Drawing Sheets

Figure 1

(56) References Cited

U.S. PATENT DOCUMENTS

| | | |
|---|---|---|
| 8,412,587 B2 | 4/2013 | Rabenold |
| 9,037,497 B2 * | 5/2015 | Rabenold ............ G06Q 30/0601 |
| | | 705/26.3 |
| 2005/0280651 A1 * | 12/2005 | Geddes ................ G11B 27/105 |
| | | 345/547 |
| 2006/0122929 A1 | 6/2006 | Schoen |
| 2007/0157228 A1 * | 7/2007 | Bayer ................. H04N 21/4331 |
| | | 725/34 |
| 2008/0271070 A1 * | 10/2008 | Kanojia ............. G06Q 30/0251 |
| | | 725/32 |
| 2013/0019261 A1 * | 1/2013 | Huber .................... G06Q 30/08 |
| | | 725/32 |
| 2013/0054405 A1 | 2/2013 | Rabenold |
| 2015/0052571 A1 * | 2/2015 | Stokking .......... H04N 21/23418 |
| | | 725/116 |
| 2015/0206231 A1 * | 7/2015 | Smith .................... G06Q 30/08 |
| | | 705/26.3 |
| 2016/0337426 A1 * | 11/2016 | Shribman ............ H04L 65/4084 |
| 2018/0020243 A1 * | 1/2018 | Ni ......................... G11B 27/031 |

OTHER PUBLICATIONS

Website page from http://www.awgremarketing.com/awgsimulcast/services.html; printed Jul. 16, 2017.

\* cited by examiner

SYSTEM AND METHOD FOR SYNCHRONIZED VIDEO LOGGING AND PLAYBACK OF AUCTION ACTIVITY

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015-2017 Auction Frontier, LLC, All Rights Reserved.

TECHNICAL FIELD

This patent application relates to computer-implemented software systems, according to one embodiment, and more specifically to auction systems and to a system and method for synchronized video logging and playback of auction activity.

BACKGROUND

Online auctions are popular in the industry. Because of their ease of use, online auctions attract millions of sellers and buyers every day for the sole purpose of auctioning off and buying goods. Clearly, live auctions of such a scale are not realistic where bidders must be physically present. Traditionally, live auctions utilize a format whereby items put up for bid are placed on an auction sale list. Thereafter, the listed items are auctioned consecutively at a pre-established date and time. When the live auction begins, one listed item at a time is auctioned off until no items remain. The auction on individual items ends when no further bids are submitted. In contrast, typical online auctions allow for multiple items to be auctioned simultaneously. The start and finish time for the online auction items is independent from the other items being auctioned. Typically, online auctions end at a pre-established time rather than when no further bids are submitted.

Because of the high degree of simultaneous activity that occurs in online auctions, it can be difficult to create, maintain, and use a record of the activity that occurs for each auctioned item in each online auction.

SUMMARY

In various example embodiments, a system and method for synchronized video logging and playback of auction activity are disclosed. In the various example embodiments described herein, a computer-implemented tool or software application (app) as part of an auction management system is described to automate synchronized video logging and playback of auction activity using multiple video feeds and related bid logs. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system.

The auction management system of the various example embodiments described herein provides an auction management system with auction activity video recording and playback with synchronized bid logs. The auction management system can record multiple video streams and timestamped bidding actions recorded in bid logs at an auction event. The auction management system of an example embodiment provides among the following features and advantages:

- Video recording/playback with support for multiple simultaneous video streams;
- Bid logs that are time-synchronized with the corresponding video streams;
- Bid log items shown during playback feature a 'heat' indicator that starts a solid green (or other alternate) color the moment the log item takes place that slowly fades over a period of several seconds;
- The user can pick any auctioned item from a dropdown box and the video playback will immediately advance to the place in the video stream where that item exists; and
- The user can define a 'clip', which consists of a window of time from the master video, which can then be emailed to any user in the form of a link. Upon clicking the link, the user will see a playback of the window of time only. The clip will also show the synchronized bid logs.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for synchronized video logging and playback of auction activity are disclosed. In various embodiments, a software application program is used to automate synchronized video logging and playback of auction activity using multiple video feeds and related bid logs. As described in more detail below, the computing or communication system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system.

Figure 1:
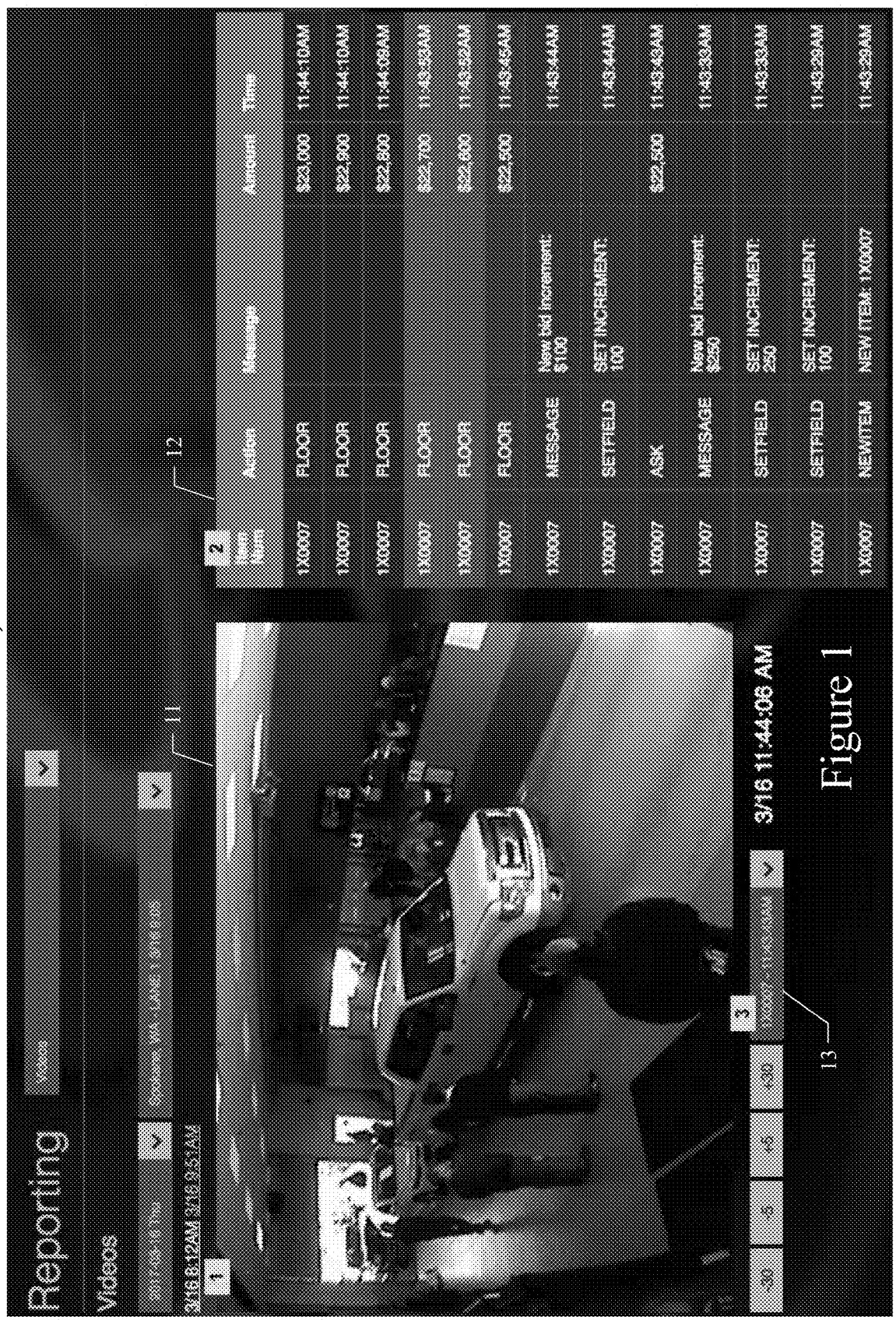
FIG. 1 illustrates an example user interface screen snapshot of an example embodiment of the auction management system with synchronized video logging and playback of auction activity.

FIG. 1 illustrates an example user interface screen snapshot 10 of an example embodiment of the auction management system with synchronized video logging and playback of auction activity. The left side portion of FIG. 1 illustrates a video stream viewing area 11 with which a user can view a live video feed from an auction event or view a playback of a recorded video stream captured at an auction event. The video stream viewing area 11 can be partitioned into a plurality of different regions in which the user can view multiple video feeds via the user interface as part of the auction management system. Moreover, the entire video stream viewing area 11 can be used to view multiple video feeds, selectable by the user via the user interface. The right side portion of FIG. 1 illustrates a bid log shown in a bid log region 12 with which a user can view the bidding activity related to a selected auction or an auctioned item. In an example embodiment, the bid log shown in the bid log region 12 can provide a variety of bidding or auction activity information including, but not limited to, an item number corresponding to a particular item being auctioned, a description or status of the particular bidding activity, a message or comment related to the particular bidding activity, an amount corresponding to the current highest bid for an item, and a time corresponding to the timing of the bidding activity. It will be apparent to those of ordinary skill in the art that a variety of other bidding or auction related information can be provided in the bid log shown in the bid log region 12. The user can use the dropdown box 13, provided by the user interface, to select a desired auction, auctioned item, or bidding activity event. The user can also use the dropdown box 13 to select a time window of interest. The video stream corresponding to the user selected auction, item, or event and time window is displayed in the viewing area 11. The bid log corresponding to the user selected auction, item, or event is displayed in the bid log region 12. As described in more detail below, the video stream selected by the user and shown in the video stream viewing area 11 is synchronized with the bid log shown in the bid log region 12. This synchronization of the video stream and the bid log enables the user to see the bidding activity for a particular auction item along with a corresponding time-synchronized video view of the auction event and the bidding activity associated with the auction item. The synchronized video stream and bid log provide verifiable proof of the activity, sale, and timing related to the auction of a particular item. As also described in more detail below, the user can select a desired previously recorded auction, auctioned item, or bidding event for playback. The auction management system will advance through the recorded video stream or streams and locate the portion of the video stream(s) at which the images corresponding to the selected item or event are recorded. The auction management system will also locate the corresponding time-synchronized bid log corresponding to the selected item or event. The selected video portion and corresponding bid log for the selected item or event are shown to the user as a video and data playback in the user interface 10 as described above. Additionally, a selected video portion and corresponding bid log for a selected item or event can be shared with other users as a link or an attachment to an email or text message. Further details of the example embodiments are described in more detail below in connection with the diagrams provided herewith.

Figure 2:
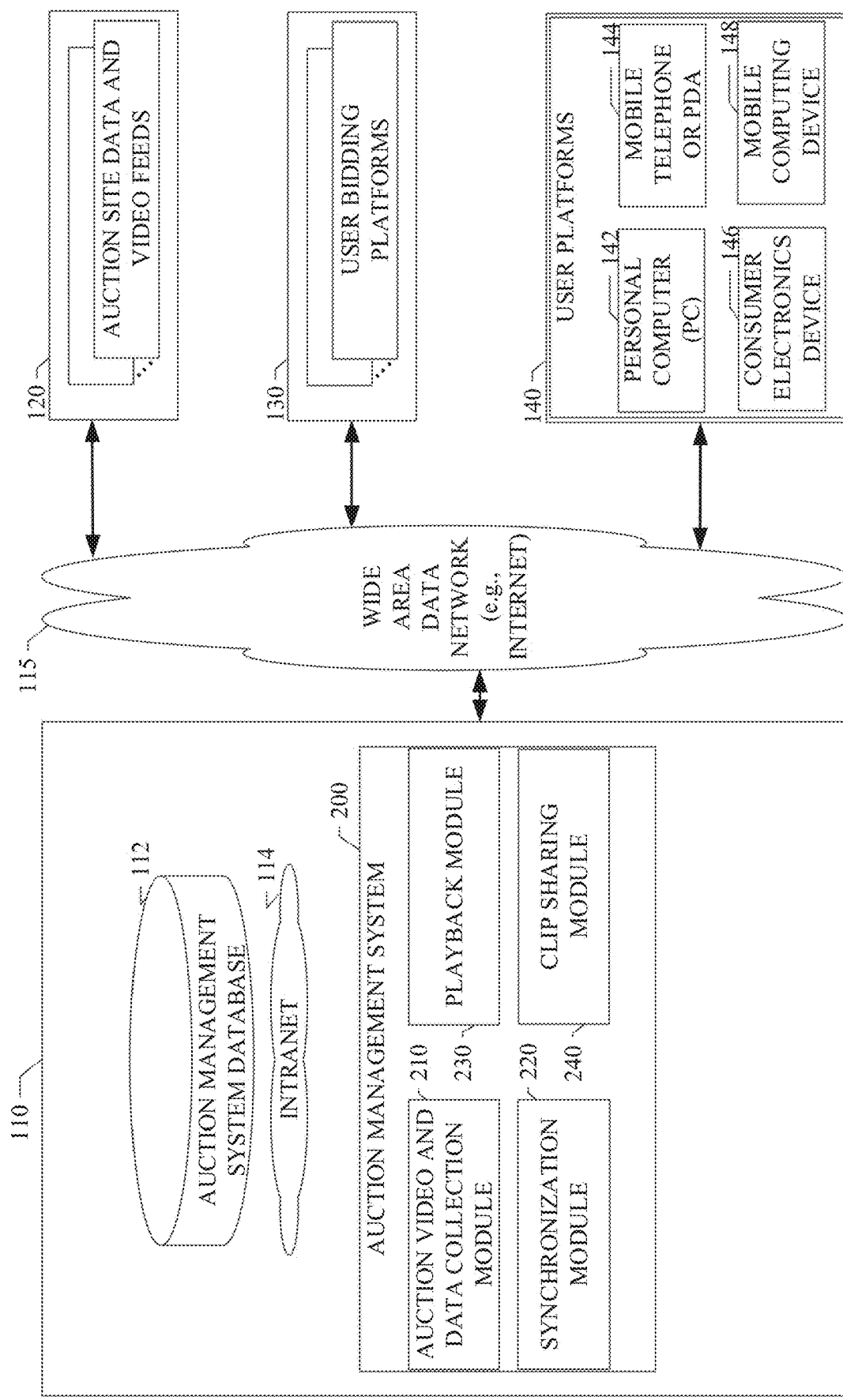
FIG. 2 illustrates an example embodiment of a networked system in which various embodiments may operate.

FIG. 2, in an example embodiment, illustrates an auction management system with auction activity video recording and playback with synchronized bid logs. In various example embodiments, an application or service, typically provided by or operating on a host site (e.g., a website) 110, is provided to enable the downloading or hosted use of the auction management system 200 of an example embodiment. In a particular embodiment, the auction management system 200 can be downloaded from the host site 110 by a user at a user platform 140. Alternatively, the auction management system 200 can be hosted by the host site 110 for a networked user at a user platform 140. The details of the auction management system 200 for an example embodiment are provided below.

Referring again to FIG. 2, the auction management system 200 can be in network communication with a plurality of auction site data and video feeds 120 and user bidding platforms 130. The auction site data and video feeds 120 can include network-connected devices, websites or other network resources at which auction information and site video is available. The auction management system 200 can be configured to obtain this auction site data and video feed information in a digital or computer-readable form via the network 115. The user bidding platforms 130 can include particular user computing and communication platforms at which individual bidders can remotely or locally interact with an active auction at or served by an auction site data and video feed 120. By use of the user bidding platform 130, a user/bidder can view current bidding activity at a particular auction, and electronically submit bids for auctioned items at the particular auction. The user/bidder can also use the example embodiments disclosed herein to view video streams of the desired auction and view corresponding synchronized data logs corresponding to the desired auction. The auction management system 200 can be configured to transfer auction related information between the user bidding platforms 130 and the auction sites 120 in a digital or computer-readable form via the network 115. Any of the user bidding platforms 130 can be configured like the user platforms 140 described in more detail below. The host site 110, auction site data and video feeds 120, user bidding platforms 130, and user platforms 140 may communicate and transfer data and information in the data network ecosystem shown in FIG. 2 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including $2^{nd}$ (2G), 2.5, $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, 5G, and future access networks may enable wide area coverage for mobile devices, such as one or more of client devices 141, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The auction site data and video feeds 120, user bidding platforms 130, and/or the user platforms 140 may include any of a variety of consumers or providers of network transportable digital data. The network transportable digital data can be transported in any of a family of file formats, protocols, and associated mechanisms usable to enable a host site 110 to transfer auction related data between the auction site data and video feeds 120, the user bidding platforms 130, and the user platforms 140 over the network 115. In one embodiment, the file format can be a binary data format or a video data stream format, however, the various embodiments are not so limited, and other file formats and transport protocols may be used. For example, any electronic file format, such as Microsoft™ Access Database Format (MDB), Portable Document Format (PDF), audio (e.g., Motion Picture Experts Group Audio Layer 3-MP3, and the like), video (e.g., MP4, and the like), and any proprietary interchange format defined by specific sites can be supported by the various embodiments described herein.

In a particular embodiment, a user platform 140 with one or more client devices enables a user to access data provided by the auction management system 200 via the host 110 and network 115. The user bidding platforms 130 can be implemented as user platforms 140. The client devices of user platforms 140 may include virtually any computing device that is configured to send and receive information over a network, such as network 115. Such client devices may include portable devices 144, such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The client devices may also include other computing devices, such as personal computers 142, multiprocessor systems, microprocessor-based or programmable consumer electronics, network PC's, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a full screen color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The client devices of user platform 140 may also include at least one client application that is configured to receive or transmit auction related data with another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 2, the auction management system 200 of an example embodiment is shown to include an auction management system database 112. The database 112 can be used to retain a variety of information data sets including, but not limited to, auction information, auction item listing information, bidder information, bidding activity information, timing information, buyer/seller/item analytics, and the like. It will be apparent to those of ordinary skill in the art that the auction management system database 112 can be locally resident at the host site 110 or remotely located at other server locations or stored in network cloud storage.

Referring again to FIG. 2, host site 110 of an example embodiment is shown to include the auction management system 200. In an example embodiment, auction management system 200 can include an auction data and video collection module 210, a synchronization module 220, a playback module 230, and a clip sharing module 240. Each of these modules can be implemented as software components executing within an executable environment of auction management system 200 operating on host site 110 or user platform 140. Each of these modules of an example embodiment is described in more detail below in connection with the figures provided herein.

Referring still to FIG. 2, the auction management system 200 can include an auction data and video collection module 210. The auction data and video collection module 210 can be configured to perform the processing as described herein. Initially, the auction data and video collection module 210 can be configured to establish, by use of a data processor and the data network 115, a data connection with at least one auction site at which items can be auctioned. The data connection can be configured to receive a plurality of auction video content streams from a plurality of video feeds at the auction site. Each video stream can include identifying information and timing information corresponding to the video stream and the view at the auction site being captured by the video stream. The auction site may have one or many auction stages or platforms on which items are auctioned. These auction stages may be captured by one or more of the video streams. Other video streams may be configured to capture an auctioneer, an auction director, a gallery of bidders, or other locations at the auction site of interest to the auction administrators, the bidders, or item sellers. The auction data and video collection module 210 can be configured to receive the plurality of video streams from one or more auction sites and record the video streams on a video recording device, a data storage device, or in database 112.

The auction data and video collection module 210 can also be configured to receive auction data files from the one or more auction sites. The data files can represent auction related data including auction item identifiers, auction item descriptions, bidding activity data, bid prices, timing data, and other auction related data that can populate fields in the auction bid log. The auction data and video collection module 210 can be configured to receive and record the auction data files in database 112.

Referring still to FIG. 2, the auction management system 200 can include a synchronization module 220. The synchronization module 220 can be configured to perform the processing as described herein. The synchronization module 220 can be configured to synchronize the plurality of auction video streams with the corresponding data in the auction data files. The synchronization module 220 can use the identifying information and timing information for each video stream to synchronize the video stream with corresponding auction data files, which also include timing information. The synchronization can include generating and storing markers, pointers, paths, links, uniform resource locators (URLs), or other mechanisms for associating a storage location of a particular portion of a video stream (herein a video clip) with the storage location of a corresponding portion of the auction data files that relates to the video clip. In this manner, the synchronization module 220 can form close synchronized connections between the auction video streams and the auction data files. This synchronized connection enables fast and convenient retrieval and playback of the video streams and related data files.

Referring still to FIG. 2, the auction management system 200 can include a playback module 230. The playback module 230 can be configured to perform the processing as described herein. In particular, the playback module 230 can be configured to provide a user interface on a user platform device with which a user can select a particular portion of the auction data file or a time window of interest and implicitly the corresponding video stream or video clip for rendering on a display device and/or audio device of the user platform. For example, the user interface 10 shown in FIG. 1 illustrates such a user interface. Referring again to FIG. 1, the user can use the dropdown box 13, provided by the user interface, to select a desired auction, auctioned item, bidding activity event, or time window of interest. The video stream corresponding to the user selected auction, item, event, or time window is displayed in the viewing area 11. The bid log corresponding to the user selected auction, item, event, or time window is displayed in the bid log region 12. The playback module 230 can use the synchronization markers, pointers, paths, links, uniform resource locators (URLs), or other mechanisms generated by the synchronization module 220 to locate the selected portion of the auction data files and the corresponding video clip, wherein the selected portion of the auction data files includes the bid log data that relates to the video clip. The corresponding video clip is rendered in the viewing area 11 and the selected bid log data is rendered in the bid log region 12. As a result, the user can navigate to any portion of a pre-recorded auction event and view the desired portion of the bid log and the corresponding video clip. This feature enables the generation and storage of a synchronized video and bid log record for any auction event. This auction record provides verifiable evidence of the events occurring at an auction.

Referring still to FIG. 2, the auction management system 200 can include a clip sharing module 240. The clip sharing module 240 can be configured to perform the processing as described herein. In particular, the clip sharing module 240 can be configured to enable the transfer of a synchronized video and bid log record to any other authorized party via a data network transfer. Once a synchronized video and bid log record is generated and selected by a user as described above, the selected portion of the bid log and the corresponding video clip can be combined into one or more files for transfer on the data network. In one example embodiment, the selected portion of the bid log and the corresponding video clip can be sent as an attachment in an email or text message. Alternatively, links to the selected portion of the bid log and/or the corresponding video clip can be embedded or attached in an email or text message. The data corresponding to the stored video and auction data files can be retained in cloud storage for access to authorized third parties. As such, any authorized third party can receive and view any portion of a pre-recorded auction event, including the synchronized video recording and the corresponding bid log.

Figure 3:
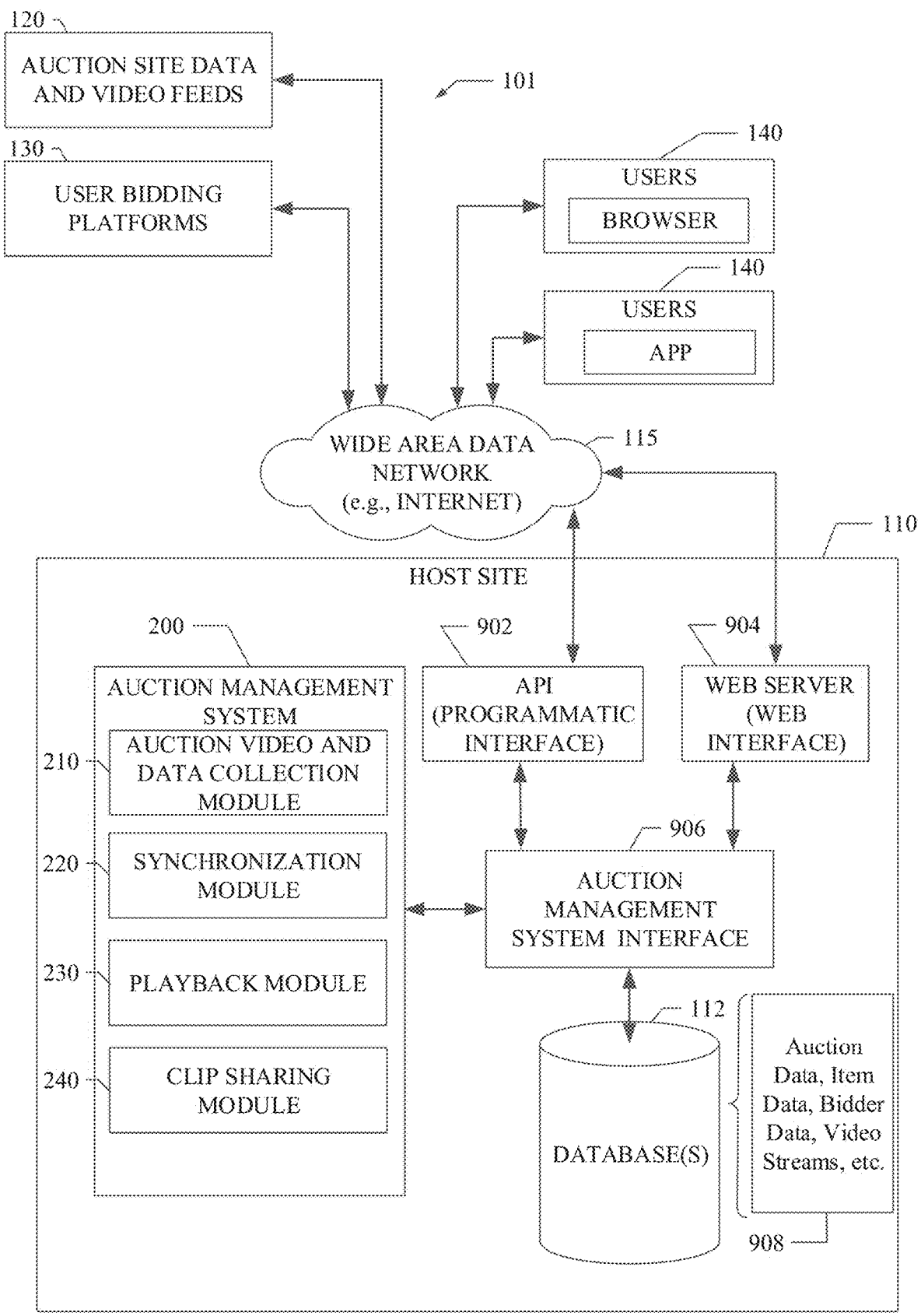
FIG. 3 illustrates another example embodiment of a networked system in which various embodiments may operate.

Referring now to FIG. 3, another example embodiment 101 of a networked system in which various embodiments may operate is illustrated. In the embodiment illustrated, the host site 110 is shown to include the auction management system 200. The auction management system 200 is shown to include the functional components 210-240, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with the auction sites or other network entities on a programmatic or automated data transfer level. The API 902 and web interface 904 may be configured to interact with the auction management system 200 either directly or via an interface 906. The auction management system 200 may be configured to access a data storage device 112 either directly or via the interface 906.

Figure 4:
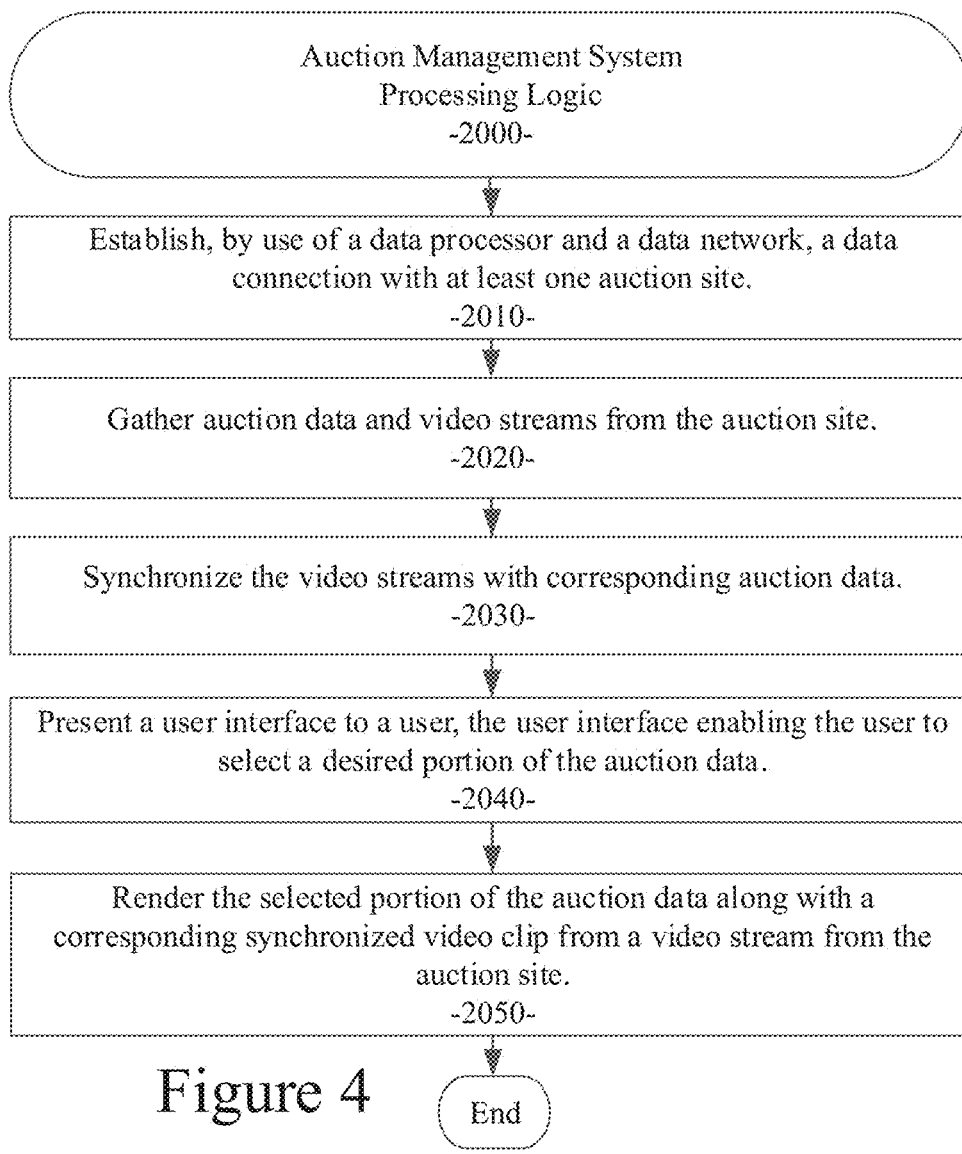
FIG. 4 illustrates a processing flow diagram that illustrates an example embodiment of a method as described herein.

Referring now to FIG. 4, a processing flow diagram illustrates an example embodiment of a method implemented by the auction management system 200 as described herein. The method 2000 of an example embodiment includes: establishing, by use of a data processor and a data network, a data connection with at least one auction site (processing block 2010); gathering auction data and video streams from the auction site (processing block 2020); synchronizing the video streams with corresponding auction data (processing block 2030); presenting a user interface to a user, the user interface enabling the user to select a desired portion of the auction data (processing block 2040); and rendering the selected portion of the auction data along with a corresponding synchronized video clip from a video stream from the auction site (processing block 2050).

Figure 5:
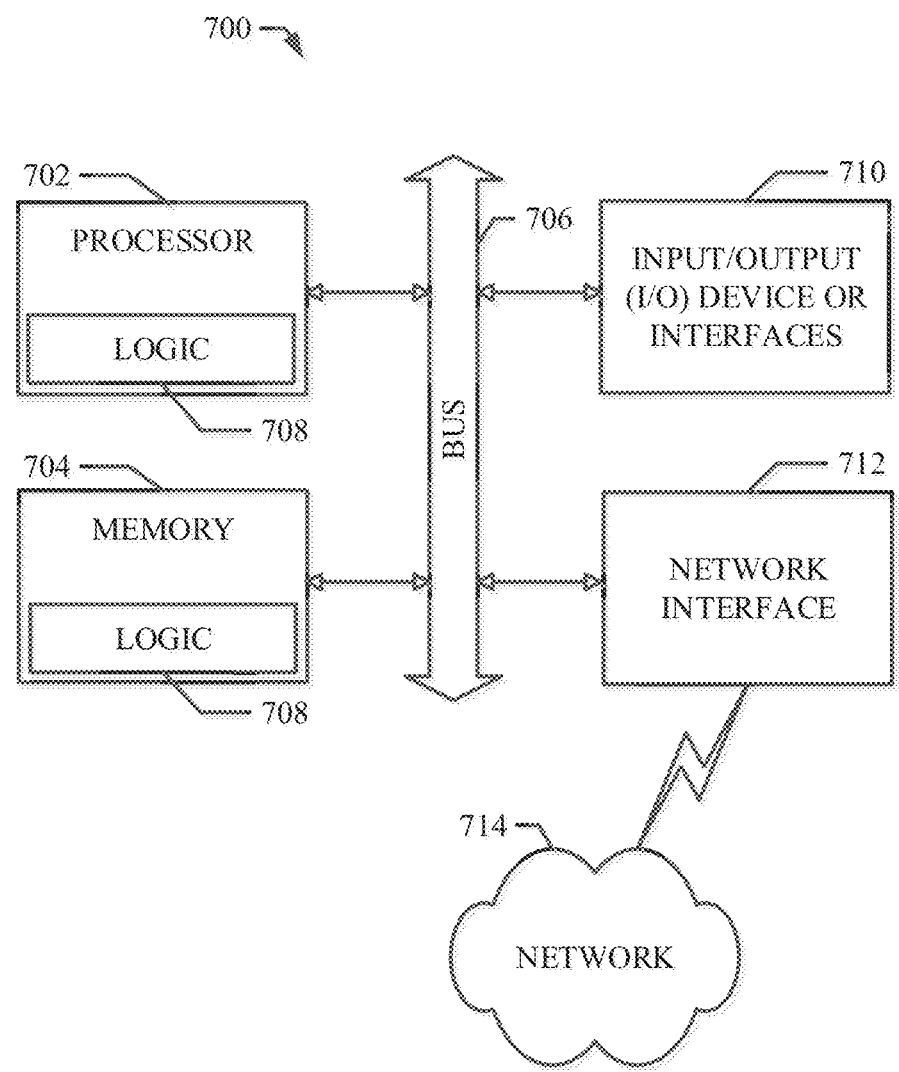
FIG. 5 shows a diagrammatic representation of a machine in the example form of a computer system within which a set of instructions when executed may cause the machine to perform any one or more of the methodologies discussed herein.

FIG. 5 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for synchronized video logging and playback of auction activity are disclosed. In various embodiments, a software application program is used to enable the management and presentation of auction and bidding information on the display screen of a computing or communication system, including mobile devices. As described above, in a variety of contexts, the auction management system 200 of an example embodiment can be configured to automatically obtain a variety of information from one or more $3^{rd}$ party sites via a data network to facilitate the user experience of searching, viewing, bidding, and purchasing a specific item at an auction, all from the convenience of a portable electronic device, such as a smartphone. This collection of auction-related transaction and activity information has traditionally been possible only via multiple, personal interactions with a plurality of different parties at different locations. The embodiments as presently disclosed and claimed enable these disparate transactions to be integrated into a single set of electronic interactions with a mobile device or other computing device. As such, the various embodiments as described herein are necessarily rooted in computer and network technology and serve to improve these technologies when applied in the manner as presently claimed. In particular, the various embodiments described herein improve the use of mobile device technology and data network technology in the context of auction transactions conducted via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor;
   a database in data communication with the data processor;
   a network interface, in data communication with the data processor, for communication on a data network; and
   an auction management system, executable by the data processor, to:
   establish, by use of the data processor and the data network, a data connection with at least one auction site;
   gather, by use of the data processor and the data network, auction data and a plurality of video streams from the at least one auction site;
   store, by use of the data processor, each of the plurality of video streams and the corresponding auction data in the database, wherein the auction management system is further configured to generate and store in the database a plurality of markers for each of the plurality of video streams, each of the plurality of markers for at least one of the plurality of video streams associating a storage location of a portion of the at least one of the plurality of video streams with a storage location of a corresponding portion of the auction data that relates to the portion of the at least one of the plurality of video streams, each of the plurality of markers for the at least one of the plurality of video streams corresponding to a different portion of the at least one of the plurality of video streams, the auction management system being further configured to generate pointers, paths, links, uniform resource locators (URLs), or other mechanisms for associating the portion of the at least one of the plurality of video streams that corresponds to the particular marker with the storage location corresponding to the selected portion of the auction data;
   present, by use of the data processor, a user interface to a user, the user interface enabling the user to select a desired portion of the auction data;
   obtain, by use of the data processor, a particular marker of the plurality of markers that corresponds to the portion of the auction data selected by the user;
   process, by use of the data processor, the particular marker to implicitly determine a storage location of a portion of at least one of the plurality of video streams that corresponds to the particular marker; and
   render, by use of the data processor, the selected portion of the auction data along with the corresponding portion of the at least one of the plurality of video streams that corresponds to the particular marker.

2. The system of claim 1 wherein the selected portion of the auction data corresponds to a portion of an auction bid log.

3. The system of claim 1 wherein the auction data includes auction item identifiers, auction item descriptions, bidding activity data, bid prices, timing data, and other auction related data that can populate fields in an auction bid log.

4. The system of claim 1 wherein the auction management system being further configured to establish, by use of the data processor and the data network, a data connection with the user.

5. The system of claim 1 wherein the auction management system being further configured to enable transfer of the selected portion of the auction data along with the corresponding portion of the at least one of the plurality of video streams that corresponds to the particular marker to any other authorized party via a data network transfer.

6. The system of claim 1 wherein the auction management system being further configured to enable transfer of the selected portion of the auction data along with the corresponding portion of the at least one of the plurality of video streams that corresponds to the particular marker to any other authorized party in an email or text message.

7. A computer-implemented method comprising:
   establishing, by use of a data processor and a data network, a data connection with at least one auction site;
   gathering, by use of the data processor and the data network, auction data and a plurality of video streams from the at least one auction site;
   storing, by use of the data processor and the data network, each of the plurality of video streams and the corresponding auction data in a database, wherein the storing includes generating and storing in the database a plurality of markers for each of the plurality of video streams, each of the plurality of markers for at least one of the plurality of video streams associating a storage location of a portion of the at least one of the plurality of video streams with a storage location of a corresponding portion of the auction data that relates to the portion of the at least one of the plurality of video streams, each of the plurality of markers for the at least one of the plurality of video streams corresponding to a different portion of the at least one of the plurality of video streams;
   generating pointers, paths, links, uniform resource locators (URLs), or other mechanisms for associating the portion of the at least one of the plurality of video streams that corresponds to the particular marker with the storage location corresponding to the selected portion of the auction data;
   presenting, by use of the data processor, a user interface to a user, the user interface enabling the user to select a desired portion of the auction data;
   obtaining, by use of the data processor, a particular marker of the plurality of markers that corresponds to the portion of the auction data selected by the user;
   processing, by use of the data processor, the particular marker to implicitly determine a storage location of a portion of at least one of the plurality of video streams that corresponds to the particular marker; and
   rendering, by use of the data processor, the selected portion of the auction data along with the corresponding portion of the at least one of the plurality of video streams that corresponds to the particular marker.

8. The method of claim 7 wherein the selected portion of the auction data corresponds to a portion of an auction bid log.

9. The method of claim 7 wherein the auction data includes auction item identifiers, auction item descriptions, bidding activity data, bid prices, timing data, and other auction related data that can populate fields in an auction bid log.

10. The method of claim 7 including establishing, by use of the data processor and the data network, a data connection with the user.

11. The method of claim 7 including enabling transfer of the selected portion of the auction data along with the corresponding portion of the at least one of the plurality of video streams that corresponds to the particular marker to any other authorized party via a data network transfer.

12. The method of claim 7 including enabling transfer of the selected portion of the auction data along with the corresponding portion of the at least one of the plurality of video streams that corresponds to the particular marker to any other authorized party in an email or text message.

13. A non-transitory machine-useable storage medium embodying instructions which, when executed by a machine, cause the machine to:
establish, by use of a data processor and a data network, a data connection with at least one auction site;
gather, by use of the data processor and the data network, auction data and a plurality of video streams from the at least one auction site;
store, by use of the data processor and the data network, each of the plurality of video streams and the corresponding auction data in a database, wherein the instructions are further configured to generate and store in the database a plurality of markers for each of the plurality of video streams, each of the plurality of markers for at least one of the plurality of video streams associating a storage location of a portion of the at least one of the plurality of video streams with a storage location of a corresponding portion of the auction data that relates to the portion of the at least one of the plurality of video streams, each of the plurality of markers for the at least one of the plurality of video streams corresponding to a different portion of the at least one of the plurality of video streams;
generate pointers, paths, links, uniform resource locators (URLs), or other mechanisms for associating the portion of the at least one of the plurality of video streams that corresponds to the particular marker with the storage location corresponding to the selected portion of the auction data;
present, by use of the data processor, a user interface to a user, the user interface enabling the user to select a desired portion of the auction data;
obtain, by use of the data processor, a particular marker of the plurality of markers that corresponds to the portion of the auction data selected by the user;
process, by use of the data processor, the particular marker to implicitly determine a storage location of a portion of at least one of the plurality of video streams that corresponds to the particular marker; and
render, by use of the data processor, the selected portion of the auction data along with the corresponding portion of the at least one of the plurality of video streams that corresponds to the particular marker.

14. The non-transitory machine-useable storage medium of claim 13 wherein the selected portion of the auction data corresponds to a portion of an auction bid log.

15. The non-transitory machine-useable storage medium of claim 13 wherein the auction data includes auction item identifiers, auction item descriptions, bidding activity data, bid prices, timing data, and other auction related data that can populate fields in an auction bid log.

16. The non-transitory machine-useable storage medium of claim 13 wherein the instructions being further configured to establish, by use of the data processor and the data network, a data connection with the user.

17. The non-transitory machine-useable storage medium of claim 13 wherein the instructions being further configured to enable transfer of the selected portion of the auction data along with the corresponding portion of the at least one of the plurality of video streams that corresponds to the particular marker to any other authorized party via a data network transfer.

* * * * *